United States Patent [19]
Bewick

[11] Patent Number: 6,072,873
[45] Date of Patent: Jun. 6, 2000

[54] DIGITAL VIDEO BROADCASTING

[75] Inventor: Simon Bewick, Tilehurt, United Kingdom

[73] Assignee: LSI Logic Corporation, Milpitas, Calif.

[21] Appl. No.: 09/034,657

[22] Filed: Mar. 3, 1998

[30] Foreign Application Priority Data

Mar. 6, 1997 [GB] United Kingdom ................ 9704638

[51] Int. Cl.$^7$ ................................................ H04N 7/167
[52] U.S. Cl. .................... 380/217; 380/200; 380/210; 380/216; 380/269; 380/36; 380/37; 377/42; 377/73
[58] Field of Search ................................ 380/200, 210, 380/216, 217, 269, 36, 37; 377/42, 73, 104

[56] References Cited

U.S. PATENT DOCUMENTS

| 4,547,802 | 10/1985 | Fogarty et al. | 358/119 |
|---|---|---|---|
| 4,563,702 | 1/1986 | Heller et al. | 358/119 |
| 4,581,746 | 4/1986 | Arnold | 375/5 |
| 4,646,147 | 2/1987 | Krijer | 380/14 |
| 5,509,077 | 4/1996 | Mochrmann | 380/30 |
| 5,682,425 | 10/1997 | Enari | 380/10 |
| 5,818,934 | 10/1998 | Cuccia | 380/9 |
| 5,852,663 | 12/1998 | Enari | 380/10 |
| 5,894,518 | 5/1999 | Shiojiri | 380/20 |
| 5,920,626 | 7/1999 | Durden et al. | 380/10 |

Primary Examiner—Tod R. Swann
Assistant Examiner—Paul E. Callahan

[57] ABSTRACT

In order to implement the Digital Video Broadcasting descrambling algorithm in the context of MPEG compressed data streams containing interleaved sections of scrambled and unscrambled data, at a data rate of 60 MBits/sec with a clock of 2.7 MHz, a stream cipher has an input to receive scrambled video data, and an output coupled to a block cipher for providing descrambled data, the stream cipher comprises shift register means for holding input data coupled to a first mapping logic mechanism comprising at least a first logic means and a second logic means coupled in sequence and arranged to carry out similar logical steps, and the block cipher means comprising shift register means for holding the output of the stream cipher means and a second logic mapping mechanism, comprising at least a first logic means, a second logic means, a third logic means and a fourth logic means coupled in sequence being arranged to carry out similar logical steps.

14 Claims, 4 Drawing Sheets

DIGITAL VIDEO BROADCASTING

The present invention relates to digital video broadcasting.

With the advent of digital video broadcasting (DVB), various standards have been set for design of equipment. In particular, a standard, known as the DVB descrambler algorithm has been set by the ETSI Committee for descrambling scrambled video information, such as may be required in pay-on-demand situations. There is a requirement for such algorithm to handle compressed video data, compressed according to the well known MPEG standards. The application of the DVB descrambler algorithm to typical MPEG transport data streams requires the ability to process data at rates of at least 60 MBits per second. Typical transport devices operate from a standard video clock of 27 MHz which is readily available in MPEG system designs. A straightforward implementation of the DVB descrambler algorithm using the 27 MHz clock is unable to meet a data throughput of 60 MBits per second.

The DVB descrambling algorithm consists of two ciphers, a stream cipher and a block cipher. These ciphers are described in the DVB Common Scrambling Specifications, and are specified as a step register and a step to step mapping between logical stages or conditions of the ciphers. The stream cipher requires 4 time sequential steps of the step register to process each byte of scrambled data and the block cipher requires 56 time sequential steps of the respective step register to process each 8 byte block of scrambled data. A straightforward implementation of the algorithm involves implementing the step registers as flip-flops and the step to step mappings as asynchronous logic between the flip-flop outputs and inputs. The minimum clock frequency required to support 60 Mbits/second with the stream cipher is 30 MHz and for the block cipher is 52.5 MHz in order to clock the step registers through the respective steps. Whilst it would clearly be possible to provide two separate clocks, one at 52.5 MHz and the other at 27 MHz, this is an expensive solution.

SUMMARY OF THE INVENTION

It is clearly advantageous in terms of cost and simplicity to use the same clock for the descrambling function as for the other transport processing functions. The present invention seeks to avoid the use of an extra 52.5 MHz clock by providing an implementation of the descrambling algorithm which requires only a single clock.

The present invention provides apparatus for descrambling broadcast video data, comprising a stream cipher means having an input to receive scrambled video data, and an output coupled to a block cipher means, the block cipher means having an output for providing descrambled data, wherein the stream cipher means includes shift register means for holding input data coupled to a first logic mechanism for moving the stream cipher means between logical states and for providing a stream cipher output, the first logic mechanism comprising at least a first logic means and a second logic means coupled in sequence and arranged to carry out similar logical steps, and the block cipher means including shift register means for holding the output of the stream cipher means and including a second logic mechanism coupled to the shift register means, for moving the block cipher between logical states, and having an output for providing descrambled data, the second logic mechanism comprising at least a first logic means, a second logic means, a third logic means and a fourth logic means coupled in sequence and being arranged to carry out similar logical steps.

In accordance with the invention, it is possible to speed up the descrambling operation since logical steps required for descrambling may be carried out by said logic means essentially at the same time or at least within a very short time period. The term logic mechanism as used above is equivalent to the term mapping logic as used herein, in the sense that the logic maps or moves a cipher between its logical states in carrying out a ciphering operation.

In accordance with the invention, the throughput of the cipher is increased without increasing the clocking rate by performing multiple steps of operation in each clock cycle. The ciphers contain register means implemented as flip-flops. In order to carry out multiple steps the mapping logic to calculate one step is duplicated more than once and connected serially. Thus since the stream cipher has two sets of mapping logic then as will become clear below only 2 clock cycles are required to calculate the four steps required per scrambled byte. Similarly since the block cipher contains four sets of mapping logic then only 14 clock cycles (as will become clear below) are required to process each 8 byte block of scrambled data. For these cases the minimum clock rates required to process scrambled data at 60 Mbits/second are 13.125 MHz for the stream cipher and 26.25 MHz for the block cipher.

This approach can be extended to a total of 4 steps for the stream cipher and 8 steps for the block cipher before it is necessary to increase the clock frequency for higher performance. These values yield a theoretical maximum data processing rate of 216 MBits/second for the stream cipher and 246 MBits/second for the clock cipher.

BRIEF DESCRIPTION OF THE DRAWINGS

A preferred embodiment of the invention will now be described with reference to the accompanying drawings, wherein.

DESCRIPTION OF THE PREFERRED EMBODIMENTS

Figure 1:
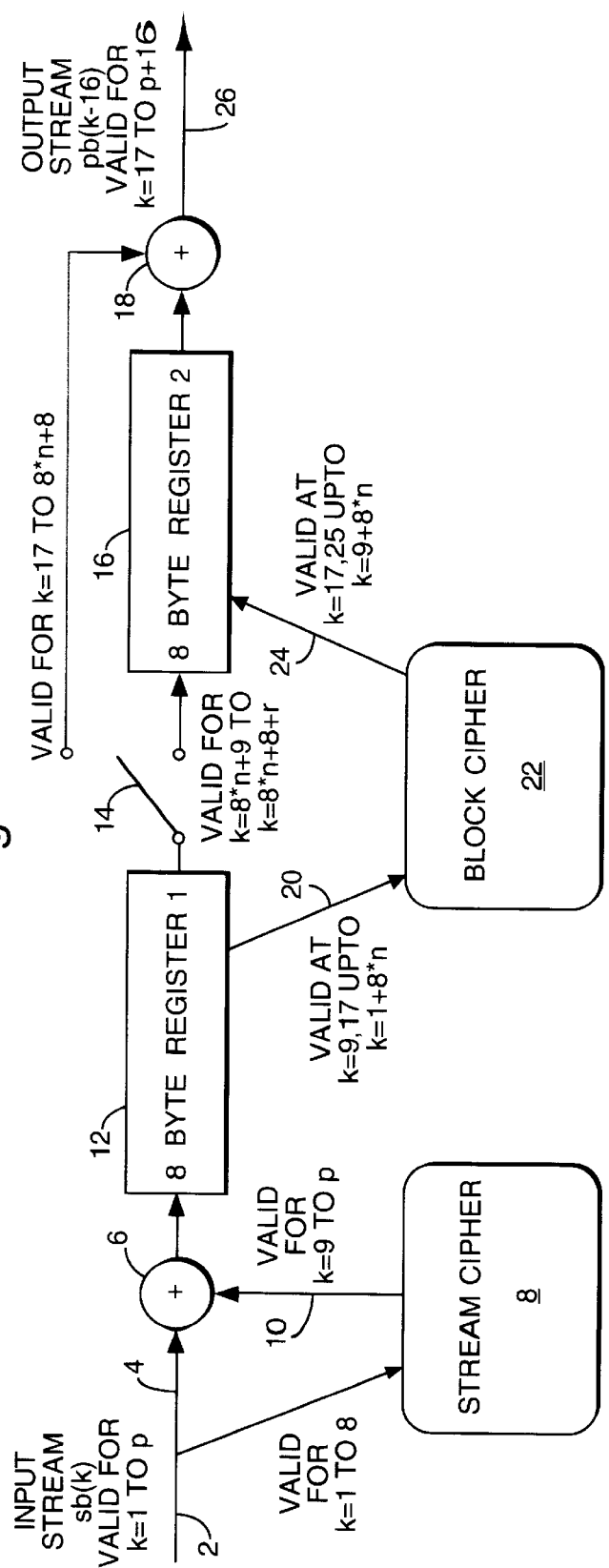
FIG. 1 is a block diagram of an implementation of the DVB descrambling algorithm, including a block cipher and a stream cipher.
Figure 2:
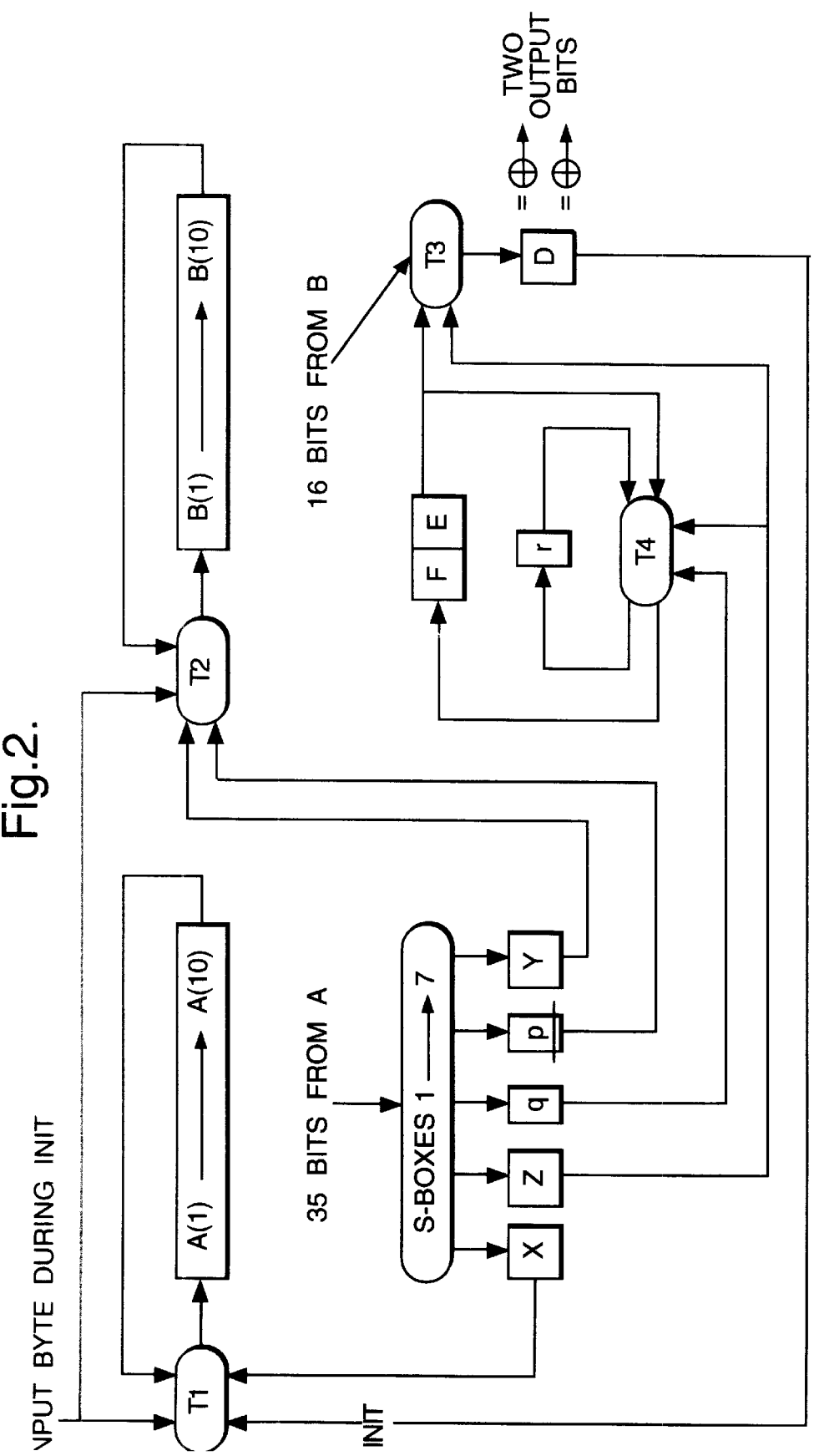
FIGS. 2 is a block diagram of a recommended implementation of the stream cipher of the DVB algorithm.

Referring now to FIG. 1, this shows an implementation of the descrambling algorithm, according to the recommendations of the ETSI Committee. An input 2 provides an input data stream to a first input 4 of an exclusive OR gate 6. The data is also applied to the input of a stream cipher unit 8 whose output is coupled to a second input 10 of the exclusive OR gate, the output of which is applied to a serial input of a shift register 12 (denoted herein as Reg 1). The serial output of the Reg 1 is coupled via a switch 14 either to the serial input of a second shift register 16 (denoted herein as Reg 2), or to an input of an exclusive OR gate 18. A parallel output 20 of Reg 1 is coupled to the input of a block cipher unit 22, whose output is applied to the parallel input 24 of Reg 2. The output of Reg 2 is applied to an input of exclusive OR gate 18, where it is combined with the data at the other input in order to provide descrambled data at an output 26. The notation in FIG. 1 is as follows:

k indexes bytes through the stream p end of a scrambled field n number of complete 8 bytes blocks in a scrambled field r the residue that is left in a scrambled field after the last complete 8 byte block of that scrambled field Referring now to FIG. 2, this shows a recommended implementation of the stream cipher unit 8 of FIG. 1. The stream cipher is a finite state machine with 107 state bits organised as 26 nibbles (4 bits per nibble) and 3 bits: 10 nibbles in register A, denoted as A1 to A10; 10 nibbles in register B, denoted as B1 to B10; 1 nibble in each register X, Y, Z, D, E and F; 1 bit in each register p, q and r. The finite state machine evolves by successive logical states or steps, the common key CK entering at the reset state. The first scrambled block SB(1) of 88 bytes (sb(1) . . . sb(8)) enters within the next 32 steps, namely the 32 steps of initialisation. Each scrambling byte is produced within 4 steps of generation. The step of reset is performed before any use of the stream cipher: the first 32 bits of CK are loaded in the state registers A1 to A8 i.e., in a1 to a32 bits and the last 32 bits of CK in the state registers B1 to B8 i.e., in b1 to b32. The other state registers, i.e., A9, A10, B9, B10, D, E, F, X, Y, Z, p, q and r, are set to 0.

In FIG. 2, the values of the registers, together with the value of the input byte, are processed according to the lines and arrows. The results of these operations appear on arrows entering the registers A1, B1, X, Y, Z, D, F and r which store these values as the results of the step. Each byte of a scrambled block SB(1) is loaded in 4 steps of initialisation; the first block SB(1) is thus loaded in 32 steps of initialisation as a sequence of 32 input bytes. At each step of initialisation the ms nibble of the input byte, denoted as IN1 is fed to transformation T1 and the 1s nibble IN2 to transformation T2. Moreover, nibble D is fed back to transformation T1. At each step of generation, there is no input byte and no feed back of nibble D. The 4 bits of register D are XORed two by two for producing two output bits. Consequently, four consecutive steps of generation are needed for producing one scrambling byte.

In registers A and B, the nibble with number i (i from 1 to 10, numbering from left to right) consists of bits 4$i$-3 to 4$i$-2, 4$i$-1 and 4$i$. The bits of A and B are respectively denoted as a1 to a40 and b1 to b40. Transformation T1 results in a nibble by XOR-ing all its input nibbles. The 4 bits resulting from T1 are fed in to A1, namely a1 a2 a3 a4. The input nibbles are A10, X, IN1 and D during a step of initialization, and A10 and X during a step of generation.

Transformation T2 first results in a nibble by XOR-ing all its input nibbles. The 4 bits are denoted as w1 w2 w3 w4. Depending upon the value of p, either w1 w2 w3 w4 (p=0) or w2 w3 w4 w1 (p=1) are fed into B1, namely b1 b2 b3 b4. The input nibbles are B7, B10, Y and IN2 during a step of initialization and B7, B10 and Y during a step of generation. The specification provides a table to fix how to extract 16 bits from B and how to XOR them 4 by 4 for producing an extra nibble for T3.

Transformation T3 results in a nibble by XOR-ing all its input nibbles, i.e., E, Z and the aforementioned extra nibble constructed from B. Register D stores the 4 bits resulting from T3, for providing two output bits via exclusive OR gates.

Transformation T4 results in 5 bits, consisting of a carry and a nibble, for updating respectively bit r and nibble F. Depending upon the value of q transformation T4, either (q=0) presents the current values of r and E, or (q=1) adds nibble Z, nibble E and bit r for obtaining a carry and a nibble. From register A, 35 bits are selected as inputs to 7 S-boxes, namely 5 bits for each S-box. The standard specification provides a table for the S-boxes (substitution boxes). The registers X, Y, Z, p and q store the 14 bits resulting from the 7 S-boxes in a given permuted order. c1 to c14 denote the resultant 14 bits. Nibble X consists of the bits c1 to c4. Nibble Y consists of the bits c5 to c8. Nibble Z consists of c9 yo c12. The bit p is c13. The bit q is c14.

Figure 3:
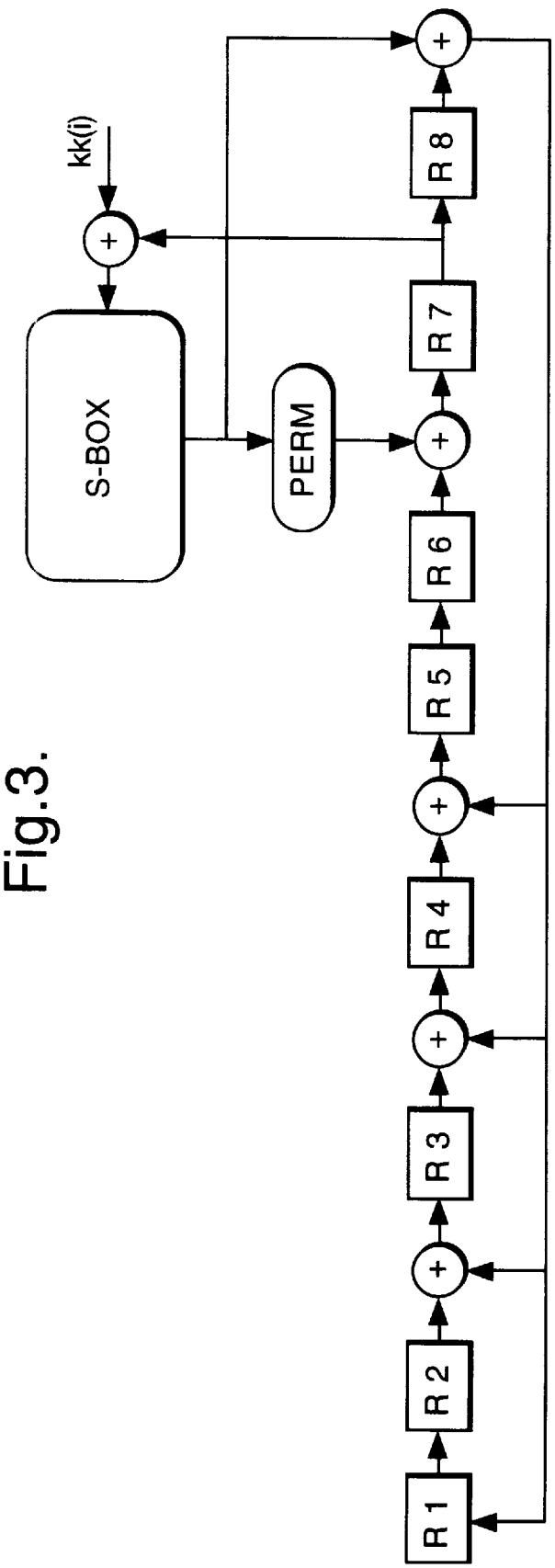
FIG. 3 is a block diagram of a recommended implementation of the block cipher of the DVB algorithm.

Referring now to FIG. 3, this shows the block cipher unit in more detail in its recommended form, according to the ETSI specification. The current data block B consists of 8 bytes denoted as b(1), b(2), . . . b(8). The input block is loaded into a block register R consisting of 8 byte registers R1, R2, . . . R8, namely b(i) into Ri. The algorithm is performed in 56 steps of operations. At the end of 56 steps, the output block is taken from the block register R namely b(i) from Ri. Each step performs operations on the 8 registers and under the control of a single key byte. The sequence of 56 key bytes for decipherment are kk(56) to kk(1). The 56 key bytes are deduced from the common key by a key schedule operation. The function labelled S-box comprises a table look up in which the input byte, regarded as an address i the range from 0 to 255, accesses a table and reads out a number in the same range, which is the output byte. The table is a permutation of the integers 0. 1, 2, . . . 255. Consequently, any two different inputs give two different outputs. The function labelled Perm permutes the bits within a byte.

According to FIG. 3, the values of the registers R1 to R8, together with the key byte kk(i), are processed according to the lines and arrows. The operations take place in parallel for each step. All operations are on one byte. The results of these operations appear on arrows entering the registers. The registers R1 to R8 store those results. There is a defined key schedule defining the derivation of the 56 key bytes kk(1) to kk(56) from the common key ck(1) to ck(8). The 56 steps of the block cipher are divided into 7 rounds of 8 steps. The construction of the 56 key bytes implies an intermediate sequence denoted as kb(1, 1), kb(1, 2), . . . kb(1, 7), kb(1, 8), . . . kb(7, 1) . . . kb(7, 2) . . . kb(7, 7), db(7, 8). The 8 bytes ck(1) to ck(8) are equal to kb(7, 1) to kb(7, 8). For each round n, a key register holds the 8 bytes kb(n, 1) to kb(n, 8). The key register for the round n-1 is derived from the key register for the round n by a 64-bit permutation called kd-perm. The successive key register values are obtained by using the kd-perm transformation between decipherment rounds. At each round n (n is valued for 1 to 7), the key byte kk(7n−7+i) results from XOR-ing the byte kb(n, i) with the byte valued to n−1.

Figure 4:
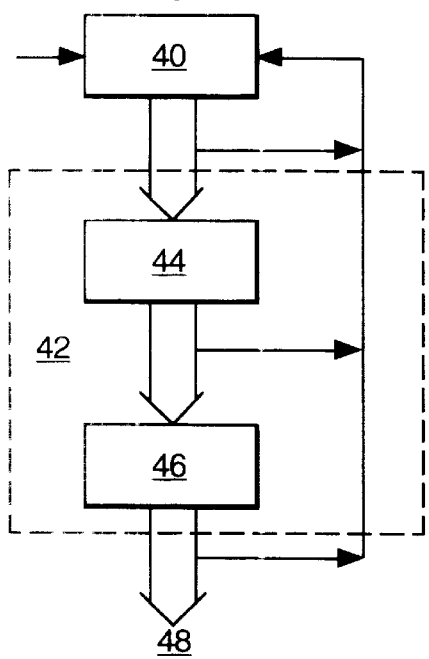
FIGS. 4 and 5 are generalised block diagrams of an implementation of the stream cipher and block cipher respectively, for the DVB algorithm, in accordance with a preferred embodiment of the invention.

Referring now to FIG. 4, this shows a generalised form of block diagram of a stream cipher unit in accordance with the invention wherein a shift register 40 holds input data and a mapping logic mechanism 42 comprises a first mapping logic unit 44 coupled to the shift register 40 and a second mapping logic unit 46 connected in series with the first logic unit 44 so they perform sequential logic operations, the outputs of logic units 44, 46 being coupled back to the shift register 40, and the output of logic 46 providing an output signal at 48. Each logic unit 44, 46 is arranged to carry out the operations and transformations shown in FIG. 2. Insofar as logics 44, 46 merely perform logical operations and do not contain shift registers or memory elements, they performed the requisite operations practically instantaneously, or at any rate within the space of a very few clock cycles. FIG. 2 requires four state cycles to accomplish its operation, whereas the arrangement shown in FIG. 4, producing at the output within each state cycle 4 output bits (2 bits per logic means), requires only two state cycles to produce an output byte.

Figure 5:
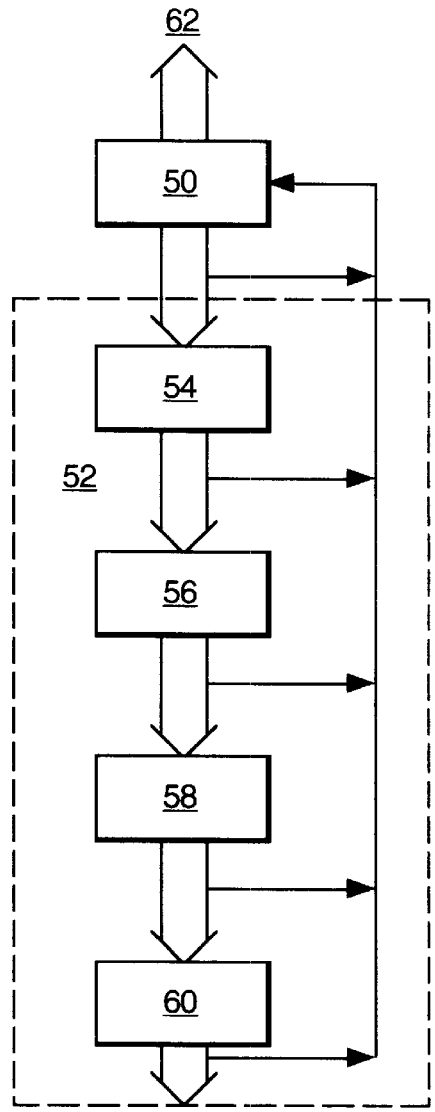

Referring now to FIG. 5, this shows a generalised form of block diagram of a block cipher unit in accordance with the invention, wherein a shift register 50 receives input data and is coupled to a logic mechanism 52 comprising first, second, third and fourth mapping logic units 54, 56, 58 and 60 connected in series so as to perform logical operations within the same state cycle. The outputs of the logic units are coupled back to the input of the shift register and the state of register 50 at tie end of the deciphering operations provides an output 62, representing descrambled data.

Each mapping logic is arranged to perform the logical operations shown in FIG. 3. As described above, the unit shown in FIG. 3 requires 56 machine cycles to carry out the algorithm. The arrangement shown in FIG. 4 takes only 14 machine cycles of operation to produce a deciphered output.

Figure 6:
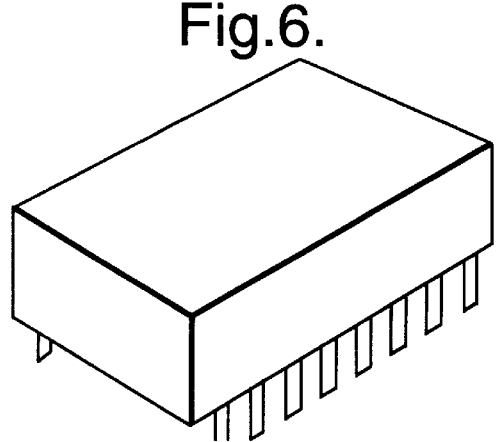
FIG. 6 is a schematic view of an integrated circuit chip incorporating the circuits of FIGS. 4 and 5.

There will now be described a detailed implementation of the unit shown in FIGS. 4 and 5. In accordance with current engineering practice, these detailed implementations will be described in terms of a software routine defined in a hardware programming language VHDL. As will be appreciated it is current engineering practice to produce hardware units from a software routine, by arranging for a computer to take the programming steps and generate directly therefrom chip lay-outs and masks. Thus there is not normally implemented detailed functional block diagrams in producing the chip shown in FIG. 6.

BLOCK CIPHER IMPLEMENTATION

Thus there will now be described a detailed implementation of the block cipher unit of FIG. 5. This following is a VHDL description that implements the block cipher defined in the DVB common scrambling specifications. The specifications detail a number of transforms and mappings which advance the state of a machine. Each of these transforms and mappings have a corresponding VHDL function or procedure defined in this file. The overall behaviour for calculating the next state of the machine from the current state and inputs is provided in the 'p_bc_one_step' procedure as a series of calls to the transform and mapping procedures and functions. The VHDL processes 'step_proc' and 'clock_proc' then build this next state generation into a synchronous state machine which advances four states per clock cycle.

The ETSI common scrambling specifications use a different bit notation to the commonly used notation of '0' as LSB and largest number as MSB. They use '1' as MSB and largest number as LSB. To help with clear translation from specification to VHDL code the code also uses this same, DVB common scrambling specifications defined, notation.

The following extract of VHDL code illustrates the process of multiple mapping logic to calculate more than one step. In the code the procedure 'p_bc_one_step' calculates one step of the clock cipher operation, and the process 'step_proc' calculates four steps of operation by repetitive calling of the procedure 'p_bc_one step'. Each successive call takes the output of the previous call as input, the final call giving as output the value to be recorded in the step flip-flops.

```
step_proc : process(step_count, current_state,
    mode, ck, curr_kb, dataIn, kki)
    variable step1_in   : t_r1r2;
    variable step1_out  : t_r1r2;
    variable step2_out  : t_r1r2;
    variable step3_out  : t_r1r2;
    variable step4_out  : t_r1r2;
begin
step1_in :=current_state;
if(mode = RUN or mode = PERM) then
    p_bc_one_step( step1_in,   kki, 4*step_count,   step1_out);
    p_bc_one_step( step1_out,  kki, 4*step_count+1, step2_out);
    p_bc_one_step( step2_out,  kki, 4*step_count+2, step3_out);
    p_bc_one_step( step3_out,  kki, 4*step_count+3, step4_out);
    next_state <= step4_out;
elsif( mode = HOLD) then
    next_state <= current_state
elsif( mode = LOAD) then
    next_state <= dataIn;
end if;
dataOut <= current_state;
end process step_proc;
```

Each iteration p_bc_one_step is carried out by one of the mapping logics 54–60 of FIG. 5.

A more detailed implementation is as follows:-

```
entity dsc_bc_top is
    port ( ck        : in   t_key;       -- common key form key file
           reset_b   : in   std_logic;   -- system_reset
           mode      : in   t_bc_mode;   -- bc mode from control block
           sclk      : in   std_logic;   -- system clock
           dataIn    : in   t_r1r2;      -- current value of reg1
           round_count : in integer      -- counter from control
                             range 0 to 7;
           step_count  : in integer      -- counter from control
                             range 0 to 1;
           dataOut   : out  t_r12r       -- data to load into reg2);
end dsc_bc_top;
architecture behave of dsc_bc_top is
Function   :f_bc_perm
```

This function performs the bit perm function defined in the common scrambling specifications.

```
function f_bc_perm( d: byte) return byte is
variable result: byte;
begin
result(1):=d(7)
result(2):=d(3)
result(3):=d(6)
result(4):=d(5)
result(5):=d(1)
result(6):=d(4);
result(7):=d(8)
result(8):=d(2)
return(result);
end f_bc_perm;
Function :f_bc_kdPerm
```

This function performs the kd perm function defined in the common scrambling specifications. It is used to generate the next kb value from the previous kb value between de-cipherment rounds.

Function :f_bc_kk_gen

This function generates the Idd word from the 64 bit kb word and the count number of the current de-cipherment round.

Function :f_bc_sbox_in_gen

This function generates the s-box input value from the current value of r7 and kki.

```
function    f_bc_sbox_in_gen(
    kki         : t_key;
    r7          : byte;
    step_count  : integer range 0 to 7
)
    return byte is
    variable s_box_in : byte;
begin
    case( step_count) is
        when7 => s_box_in: = kki(1 to 8)    xor r7;
        when6 => s_box_in: = kki(9 to 16)   xor r7;
        when5 => s_box_in: = kki(17 to 24)  xor r7;
        when4 => s_box_in: = kki(25 to 32)  xor r7;
        when3 => s_box_in: = kki(33 to 40)  xor r7;
        when2 => s_box_in: = kki(41 to 48)  xor r7;
        when1 => s_box_in: = kki(49 to 56)  xor r7;
        when0 => s_box_in: = kki(57 to 64)  xor r7;
        when others => NULL;
    end case;
    return(s_box_in);
end;
Function    : f_bc_sBox
```

This function implements the s_box mapping defined in the common scrambling specifications. It is modelled as a look up table.

Procedure :p_bc_one_step

This procedure implements the architecture diagram of the block cipher given in FIG. 3. Each of the s-box and perm generation functions defined in the specification are implemented as functions in the preceding code. This procedure calls these functions appropriately to implement one step of the decipherment defined in the architecture diagram.

```
procedure p_bc_one_step(
    current_state   : in t_r1r2;
    kki             : in t_key;
    step_count      : in integer range 0 to 7;
    next_state      : out t_r1r2
) is
variable perm_out   : byte;
variable sbox_in    : byte;
variable sbox_out   : byte;
begin
    sbox_in     : = f_bc_sbox_in_gen( kki,
                    current_state(7), step_count );
    sbox_out    : = f_bc_sbox(sbox_in);
    perm_out    : = f_bc_perm(sbox_out);
    next_state(1): = current_state(8) xor sbox_out;
    next_state(2): = current_state(1);
    next_state(3): = current_state(2) xor (current_state(8) xor sbox_out);
    next_state(4): = current_state(3) xor (current_state(8) xor sbox_out);
    next_state(5): = current_state(4) xor (current_state(8) xor sbox_out);
    next_state(6): = current_state(5);
    next_state(7): = current_state(6) xor perm_out;
    next_state(8): = current_state(7);
end;
```

The block cipher is constructed as a four step per clock cycle circuit. The implementation of one step is identical to the architecture diagram of FIG. 3. The preceding functions are written directly from that diagram using the same nomenclature. Calling the procedure 'p_bc_one_step' results in the next step values being calculated for the entire block cipher.

To achieve a four steps per clock implementation the process 'step_proc' calls 'p_bc_one_step' four times, passing the output from the first pass as the input to the second pass etc. Each step is implemented by a respective one of mapping logics 54–60 of FIG. 5. The process 'clock_proc' registers the output of the fourth pass using the system clock, and this is used as the input to the first pass next time through 'step proc'.

Control of the block cipher is achieved by applying correctly round-count, step_count and mode. round_count and step_count are as described in the common scrambling specifications, except we only need the MS bit of step_count since we have a four step per clock cycle block cipher. Mode specifies whether the block cipher is running (RUN or PERM), generating a new kb value (PERM), holding (HOLD) or loading a new 8 byte block (LOAD).

signal curr_kb : t_key;

signal next_kb : t_key;

signal current_state: t_r1r2;

signal next state : t_r1r2;

signal kld : t_key; begin

Process : kb_proc

This process generates the next value of kb depending upon the mode of the block cipher. The value next_kb is calculated for registering by clock_proc to generate curr_kb.

Process : kki_proc

This process calculates the value of kki.

Process : step_proc

This process calculates the next registered state of the block cipher depending upon the mode of the block cipher. For RUN or PERM modes four steps of operation are calculated. For HOLD mode the state is held and for LOAD mode the 8 bytes on input data in are loaded in the state register.

```
step_proc    : process( step_count, current state,
    mode, ck, curr_kb dataIn, kki
)
    variable step1_in   : t_r1r2;
    variable step1_out  : t_r1r2;
    variable step2_out  : t_r1r2;
    variable step3_out  : t_r1r2;
    variable step4_out  : t_r1r2;
begin
```

Now depending on the mode of operation we either load the next set of data from the inputs, hold the current state or generate four steps of operation. As far as step calculation is concerned PERM operation is the same as RUN operation.

```
step1_in : = current_state;
if ( mode = RUN or mode = PERM) then
    p_bc_one_step( step1_in,   kki, 4*step_count,   step1_out);
    p_bc_one_step( step1_out,  kki, 4*step_count+1, step2_out);
    p_bc_one_step( step2_out,  kki, 4*step_count+2, step3_out);
    p_bc_one_step( step3_out,  kki, 4*step_count+3, step4_out);
    next_state <= step4_out;
elsif( mode = HOLD) then
    next_state <= current_state;
elsif( mode = LOAD) then
    next_state <= dataIn;
end if;
dataOut <= current_state;
end process step_proc;
Process     : clock_proc
```

This process clocks all registered data into their registers.

```
configuration dsc_bc_top_con of dsc_bc_top is
    for behave
    end for;
d dsc_bc_top_con;
```

STREAM CIPHER IMPLEMENTATION

This following file contains a VHDL description that implements the stream cipher described above with reference to FIGS. 2, which details a number of transforms and mappings which advance the state of a machine. Each of these transforms and mapping have a corresponding VHDL function or procedure defined in this file. The overall behaviour for calculating the next state of the machine from the current state and inputs is provided in the 'p_one_step' procedure as a series of calls too the transform and mapping procedures and functions. The VHDL processes 'step_proc' and 'clock_proc' then build this next state generation into a synchronous state machine which advances two states per clock cycle. Each state is implemented by one of mapping logics 44 or 46 of FIG. 4.

```
entity dsc_sc_top is
    port ( sclk       : in std_logic;      -- system clock input
           reset_b    : in std_logic;      -- system reset
           input_byte : in byte;           -- input byte from the
                                              scrambled stream
           common-key : in t_key;          -- common key from the
                                              key file
           mode       : in t_sc_mode;      -- defines RESET, INIT,
                                              GEN or HOLD modes
           sb         : out byte           -- output byte for XORing
                                              with stream
    );
end dsc_sc_top;
``` architecture behave of dsc_sc_top is

Function : f_t1

This function performs the T1 transform for the stream cipher.

Function : f_t2

This function performs the Tr transform of the stream cipher.

Function : f_t3

This function performs the T3 transform for the stream cipher.

Function : f_t3extra

The T3 transform requires an input which is a 4 by 4 XOR of bits from the 'b' state. This function performs that XOR.

Procedure : p_t4

This function implements the T4 transform of the stream cipher. State bits r and f are updated by this transform. The transform defines an addition A11 variable are ultimately std_logic or std_logic_vector so they need conversion to integer to perform the addition.

Procedure :p_s_gen

The s-boxes require as index inputs a concatenation of various bits from the current state of 'a'. This concatenation is performed by this function. Each of the 7 s-boxes has an output from this function.

Procedure : p_s_box

This procedure implements all seven s-boxes for the stream cipher. It accepts as input the variables s1 to s7 which are the concatenation of bits from the current state of 'a'. It outputs the next state of the registers x, y, z, p and q The concatenation from the 'a' bits to create inputs s1 to s7 is performed using the 'p_s_gen' procedure defined above. Consequently 'p_s_gen' must be called before 'p_s_box'. The s-boxes themselves are defined as look up tables which will be synthesised to random logic gates.

Procedure : p_reset

This procedure implements the reset step of the stream cipher.

Procedure : p_one_step

This procedure implements FIG. 2. Each of the T transforms and the S-boxes defined have a corresponding function or procedure defined in the preceding code. This procedure calls these appropriately to cause the next value of all the state bits in the diagram to be calculated from the current values.

```
procedure p_one_step(
    signal input_byte      : in byte;
    variable step_input    : in t_stepreg;
    signal mode            : in t_sc_mode;
    variable step_output   : out t_stepreg;
    variable polarity      : inout t_polarity
) is
    variable extra         : nibble
variable s1, s2, s3, s4, s5, s6, s7: nibble
begin
```

Perform shift register advance for 'a' and 'b' states.

```
forj in 10 downto 2 loop
    step_output.a(j)    : =step_input.a(j-1);
    step_output.b(j)    : =step_input.b(j-1)
end loop;
```

Generate new value for 'a' and 'b' shift register inputs using t1 and t2. The input_byte bits that are passed to the t1 and t2 functions differ depending on the step being odd or even.

Firstly generate the next value of state 'a'.

```
if (polarity = ODD) then
    step_output.a(1)=
        f_t1 (input_byte(1 to 4),
              step_input.a(10),
              step_input.d, step_input.x,
              mode     );
else
    step-output.a(1)    :=
    f_t1 (input_byte (t to 8),
              step_input.a(10),
              step_input.d, step_input x,
              mode     );
end if;
```

Secondly generate the next value of state 'b'.

```
If ( polarity = ODD) then
    step-output.b(1) =
        f_t2 (input_byte (5 to 8),
              step_input.b(7), step_input(b(10),
```

```
                    step_input.y, step_input.p,
                        mode    );
            else
                step_output.b(1)    :=
                    f_t2 (input_byte (1 to 4),
                        step_input.b(7),step_input.b(10),
                        step_input.y, step_input.p,
                            mode    );
            end if;
```

The generation of the next 'd' state is a combination of generating an extra nibble from the current b' state, then using transform t3.

```
extra : = f_t3_extra ( step_input.b );
step_output.d : = f_t3 ( extram, step_input.e, step_input.z);
States 'f' and 'r' are generated using transform t4, and the next state of
'e' is simply the current state of 'f'.
p_t4( step.input.e. step_input.z, step_input.q, step_input.r
    step-output.r, step_output.f);
step-output.e : = step_input f;
```

Finally the states 'x', 'y', 'z', 'p' and 'q' are generated from the s-box mappings of the current state of the 'a'. The s-box mappings are done in two steps. Firstly generating the s inputs from the 'a' state bits using p_s_gen and then applying these values to the s-boxes to generate the results using p_s box.

```
        p_s_gen ( step_input.a, s1, s2,, s3, s4, s5, s6, s7 );
        p_s_box (
            s1, s2, s3, s4, s5, s6, s7,
            step_output.x, step_output.y, step_output.z,
            step_output.p, step_output.q);
        end;
```

The stream cipher is constructed as a two step per clock cycle circuit, the implementation of one step being carried out by one of the logics 44, 46. The preceding functions are written directly from that diagram using the same nomenclature. Calling the procedure 'p_one step' results in the next step values being calculated for the entire stream cipher.

To achieve a two steps per clock cycle implementation the process ;step_proc' calls 'p_one_step' twice passing the output from the pass (logic 44) as the input to the second pass (logic 46). The process 'clock_proc' registers the output of the second pass using the system clock, and this is used as the input to the first pass next time through 'step proc'.

```
        signal current_state    : t_stepreg;
        signal next_state       : t_stepreg;
        signal a_step_counter   : std_logic;
        signal step_counter     : std logic;
        signal next_sb_nibble   : nibble;
        signal int_sb           : byte;
        begin
        step_proc :     process(
            input_byte, current_state, common_key
            mode, step_counter, int_sb
        )
        variable polarity       : t_polarity;
        variable step1_in       : t_stepreg;
        variable step1_out      : t_stepreg;
        variable step2_out      : t_stepreg;
        begin
```

On RESET condition call the p_reset procedure. All next state registers are reset according to the DVC common scrambling specifications reset step definition.

```
        If (mode = RESET) then
            p_reset (common_key, next_state );
            next_sb_nibble <= '0000';
        elsif ( mode = HOLD) then
            next_state <= current_state;
            if (step_counter = '0' ) then
                next_sb_nibble <= int_sb(1 to 4);
            else
                next_sb_nibble <= int_sb(5 to 8);
            end if;
        else
```

If not in RESET or HOLD we are in either INIT or GEN. Both these conditions are implemented by the 'p_one_step' procedure. In addition we need to tell 'p_one_step' whether we are at an odd or even call number from the RESET condition. The application of the input_byte to some of the transforms changes between ODD and EVEN.

The state input to the first pass through 'p_one_step' is the current registered state. After the second pass through 'p_one_step' the output of the procedure is assigned to the 'next state' signal which is subsequently registered on the next clock edge.

```
        step1_in    : = current_state;
        polarity    : ODD;
        p_one_step(
            input-byte, step1_in,
            mode, step1_out, polarity);
        polarity:   = EVEN
        p_one_step(
            input_byte, step1_out.
            mode, step2_out,polarity
        );
        next_state <= step2_out;
```

If, in INIT then the stream cipher has no defined output and we must pass the data into reg1 unaffected. Ensure this by forcing the output to all '0'

```
        If (mode = GEN) then
            next_sb_nibble <=
                (step1_out.d(1) xor step1_out.d(2) ) &
                (step1_out.d(3) xor step1_out.d(4) ) &
                (step2_out.d(1) xor step2_out.d(2) ) &
                (step2_out.d(3) xor step2_out.d(4) ) &
        else
            next_sb_nibble <= '0000';
        end if;
        end if;
        end process step_proc;
        reset_proc; process (step_counter, mode)
        begin
            if (mode - RESET) then
                a_step_counter <= '0';
```

```
    elsif (mode = HOLD) then
        if (step_counter = '0') then
            a_step_counter <= '1'
        else
            a_step_counter <= '0'
        end if;
    else
            a_step_counter <= step_counter;
        end if;
    and process rest_proc;
    end
    configuration dsc_sc_top_con of dsc_sc_top is for behave
    end for;
    end dsc_sc_top_con;
```

What is claimed is:

1. An apparatus for descrambling broadcast video data, said apparatus comprising:
 a stream cipher, said stream cipher having:
  an input to receive scrambled video data;
  a first shift register, said first shift register capable of holding input data received by said input;
  an output, said output capable of holding output data from said stream cipher;
  a first logic mechanism coupled to said first shift register, said first logic mechanism capable of moving said stream cipher between logical states, said first logic mechanism further capable of providing said output data to said output of said stream cipher, said first logic mechanism having:
   an A logic; and
   a B logic coupled in sequence with said A logic, said A logic and said B logic constructed and arranged to carry out similar logical steps;
 a block cipher, said block cipher having:
  an output for providing de-scrambled broadcast video data;
  a second shift register, said second shift register capable of holding said output data from said stream cipher;
  a second logic mechanism coupled to said second shift register, said second logic mechanism capable of moving said block cipher between logical states, said second logic mechanism coupled to said output of said block cipher, said second logic mechanism having:
   a C logic;
   a D logic coupled in sequence with said C logic;
   a E logic coupled in sequence with said D logic; and
   a F logic coupled in sequence with said E logic, said C logic, said D logic, said E logic, and said F logic constructed and arranged to carry out similar logical steps.

2. The apparatus of claim 1, wherein said C logic, said D logic, said E logic, and said F logic of said second logic mechanism are constructed and arranged to carry out the following logical process:
 providing a step_count variable, a current_state variable, a mode variable, a ck variable, a curr_kb variable, a data in variable, a kki variable, a step1_in variable, a step1_out variable, a step2_out variable, a step3_out variable, and a step4_out variable;
 setting said step1_in variable equal to said current_state;
 if said mode is set to either RUN or PERM then
  performing a p_bc_one_step function utilizing said step1_in variable, said kki variable, said step_count variable multiplied by a factor of four, and said step1_out variable;
  performing said p_bc_one_step function utilizing said step1_out variable, said kki variable, said step_count variable multiplied by a factor of four and adding 1, and said step2_out variable;
  performing said p_bc_one_step function utilizing said step2_out variable, said kki variable, said step_count variable multiplied by a factor of four and adding 2, and said step3_out variable;
  performing said p_bc_one_step function utilizing said step3_out variable, said kki variable, said step_count variable multiplied by a factor of four and adding 3, and said step4_out variable; and
 setting a next_state variable equal to said step4_out variable;
 otherwise, if said mode is set to HOLD then
  setting said next_state variable equal to said current_state variable;
 otherwise, if said mode is set to LOAD then
  setting said next_state variable equal to said data in variable; and
 setting a dataOut variable to said current_state variable.

3. The apparatus of claim 1, wherein said C logic, said D logic, said E logic, and said F logic of said second logic mechanism are constructed and arranged to carry out the following logical process:
 providing a current_state variable having eight values in sequence, a kki variable, a step_count variable, a next_state variable having eight values in sequence, a perm_out variable, an sbox_in variable, and an sbox_out variable;
 setting said sbox_in variable equal to the result of an f_bc_sbox_in_gen function utilizing said kki variable, said current_state variable, and said step_count variable;
 setting said sbox_out variable equal to the result of an f_bc_sbox function utilizing said sbox_in variable;
 setting said perm_out variable equal to the result of an f_bc_perm function utilizing said sbox_out variable;
 setting said first value of said next_state variable equal to the result of said eighth value of said current_state variable XOR said sbox_out variable;
 setting said second value of said next_state variable equal to said first value of said current_state variable;
 setting said third value of said next_state variable equal to the result of said second value of said current_state variable XOR the result of said eighth value of said current_state variable XO said sbox_out variable;
 setting said fourth value of said next_state variable equal to the result of said third value of said current_state variable XOR the result of said eighth value of said current_state variable XO said sbox_out variable;
 setting said fifth value of said next_state variable equal to the result of said fourth value of said current_state variable XOR the result of said eighth value of said current_state variable XO said sbox_out variable;
 setting said sixth value of said next_state variable equal to said fifth value of said current_state variable;
 setting said seventh value of said next_state variable equal to the result of said sixth value of said current_state variable XOR said perm_out variable; and
 setting said eighth value of said next_state variable equal to said seventh value of said current_state variable.

4. The apparatus of claim 1, wherein said A logic and said B logic of said first logic mechanism are constructed and arranged to carry out the following logical process:

provid ing an input_byte variable, providing a current_state variable, providing a common_key variable, providing a mode indicator, providing a step_counter variable, providing an int_sb register, said int_sb register having a first part and a second part, providing a polarity indicator, providing a step1_in variable, providing a step1_out variable, providing a step2_out variable, providing at least one next_state register, providing a next_sb_nibble variable, said next_sb_nibble variable having four values in sequence;

if said mode indicator is set to RESET then
  calling a reset procedure to reset all of said next_state registers according to a DVC common scrambling specification utilizing said common_key variable and said next state register,
  setting said next_sb_nibble variable equal to 0000;
otherwise if said mode indicator is set to HOLD then
  setting said next_state register to said current_state variable;
  if said step counter is equal to 0 then
    setting said next_sb_nibble variable with the values contained in said first part of said int_sb register,
  otherwise
    setting said next_sb_nibble variable with the values contained in said second part of said int_sb register;
otherwise
  setting said step1_in variable to said current_state variable;
  if said polarity indicator is set to ODD then
    calling a p_one_step procedure utilizing said input_byte variable, said step1_in variable, said mode indicator, said step1_out variable, and said polarity indicator;
  otherwise if said polarity indicator is set to EVEN then
    calling said p_one_step procedure utilizing said input_byte variable, said step1_out variable, said mode indicator, said step2_out variable, and said polarity; and
  setting said next_state variable equal to said step2_out variable;
if said mode indicator is set to GEN then
  setting said values of said next_sb_nibble variable as a function of said step1_out variable and said step2_out variable;
otherwise
  setting all of said values of said next_sb_nibble variable equal to 0.

5. The apparatus of claim 1, wherein said A logic and said B logic of said first logic mechanism are constructed and arranged to carry out the following logical process:

providing an input_byte signal having a first part and a second part, a mode signal, a polarity variable, an extra variable, an s1 variable, an s2 variable, an s3 variable, an s4 variable, and s5 variable, an s6 variable, and an s7 variable;

providing a step_input structure, said step_input structure having
  an A array, said A array containing ten sequential registers numbered one through ten;
  a B array, said B array containing ten sequential registers numbered one through ten;
  an X register, a Y register, a Z register, a D register, an E register, an F register, a P register, a Q register, and an R register, each of said registers capable of containing a value;

providing a step_output structure, said step_output structure having
  an A array, said A array containing ten sequential registers numbered one through ten;
  a B array, said B array containing ten sequential registers numbered one through ten;
  an X register, a Y register, a Z register, a D register, an E register, an F register, a P register, a Q register, and an R register, each of said registers of said step_output structure capable of containing a value, each of said registers of said step_output structure corresponding to one of said registers of said step_input structure;

performing a shift register advance on registers ten through two of said A array of said step_output structure by setting said value of each of said registers equal to said value in said A array register of said step_input structure that lies adjacent sequentially to said A array register of said step_input structure that corresponds to said A array register of said step_output structure;

performing a shift register advance on elements ten through two of said B array of said step_output structure by setting said value of each of said registers equal to said value in said B array register of said step_input structure that lies adjacent sequentially to said B array register of said step_input structure that corresponds to said B array register of said step_output structure;

if said polarity variable is set to ODD then
  setting said one register of said A array of said step_output structure equal to the result of an f_t1 function utilizing said first part of said input_byte, register said register 10 of said A array of said step_input structure, said D register of said step step_input structure, said X register of said step_input structure, and said mode signal;
otherwise
  setting said one register of said A array of said step_output structure equal to the result of an f_t1 function utilizing said second part of said input_byte register, said register 10 of said A array of said step_input structure, said D register of said step step_input structure, said X register of said step_input structure, and said mode signal;

if said polarity variable is set to ODD then
  setting said one register of said B array of said step_output structure equal to the result of an f_t2 function utilizing said second part of said input_byte, said seven register of said B array of said step_input structure, said Y register of said step_input structure, said P register of said step_input structure, and said mode signal;
otherwise
  setting said one register of said B array of said step_output structure equal to the result of an f_t2 function utilizing said first part of said input_byte, said seven register of said B array of said step_input structure, said Y register of said step_input structure, said P register of said step_input structure, and said mode signal;

setting said extra variable equal to the result of an f_t3_extra function utilizing said B array of said step_input structure;

setting said D register of said step_output structure equal to the result of an f_t3 function utilizing said extra variable, said E register of said step_input structure, and said Z register of said step_input structure;

calling a p_t4 procedure utilizing said E, Z, Q, and R registers of said step_input structure, and said R and F register of said step_output structure;

setting said E register of said step_output structure equal to said F register of said step_input structure;

calling a p_s_gen procedure utilizing said A array of said step_input structure, and said s1, s2, s3, s4, s5, s6, and s7 variables; and calling a p_s_box procedure utilizing said s1, s2, s3, s4, s5, s6, and s7 registers, and said X, Y, Z, P, and Q registers of said step_output structure.

6. The apparatus of claim 2, wherein said logical process is incorporated onto an integrated circuit chip.

7. The apparatus of claim 3, wherein said logical process is incorporated onto an integrated circuit chip.

8. The apparatus of claim 4, wherein said logical process is incorporated onto an integrated circuit chip.

9. The apparatus of claim 5, wherein said logical process is incorporated onto an integrated circuit chip.

10. A method of descrambling broadcast video data, said method comprising the steps of:

providing a stream cipher, said stream cipher having an input capable of receiving scrambled video data, said stream cipher further having an output;

providing a block cipher, said block cipher capable of receiving said output from said stream cipher, said block cipher further capable of outputting descrambled data;

moving said stream cipher between at least two logical states in order to generate a stream cipher output, said step of moving said stream cipher utilizing an A logic and a B logic coupled in sequence, said A logic and said B logic operating simultaneously, said A logic and said B logic constructed and arranged to carry out similar logical steps; and moving said block cipher between at least two logical states in order to generate said descrambled data, said step of moving said block cipher utilizing at least a C logic, a D logic, in E logic, and a F logic coupled in sequence, said C logic, said D logic, said E logic and said F logic operating simultaneously, said C logic, said D logic, said E logic, and said F logic constructed and arranged to carry out similar logical steps.

11. The method of claim 10, wherein said C logic, said D logic, said E logic, and said F logic are constructed and arranged to carry out the following logical process:

providing a step_count variable, a current_state variable, a mode variable, a ck variable, a curr_kb variable, a dataIn variable, a kki variable, a step1_in variable, a step1_out variable, a step2_out variable, a step3_out variable, and a step4_out variable;

setting said step1_in variable equal to said current_state;

if said mode is set to either RUN or PERM then performing a p_bc_one_step function utilizing said step1_in variable, said kki variable, said step_count variable multiplied by a factor of four, and said step1_out variable;

performing said p_bc_one_step function utilizing said step1_out variable, said kki variable, said step_count variable multiplied by a factor of four and adding 1, and said step2_out variable;

performing said p_bc_one_step function utilizing said step2_out variable, said kki variable, said step_count variable multiplied by a factor of four and adding 2, and said step3_out variable;

performing said p_bc_one_step function utilizing said step3_out variable, said kki variable, said step_count variable multiplied by a factor of four and adding 3, and said step4_out variable; and setting a next_state variable equal to said step4_out variable;

otherwise, if said mode is set to HOLD then setting said next_state variable equal to said current_state variable;

otherwise, if said mode is set to LOAD then setting said next_state variable equal to said data in variable; and setting a dataOut variable to said current_state variable.

12. The apparatus of claim 10, wherein said C logic, said D logic, said E logic, and said F logic are constructed and arranged to carry out the following logical process:

providing a current_state variable having eight values in sequence, a kki variable, a step_count variable, a next_state variable having eight values in sequence, a perm_out variable, an sbox_in variable, and an sbox_out variable;

setting said sbox_in variable equal to the result of an f_bc_sbox_in_gen function utilizing said kki variable, said current_state variable, and said step_count variable;

setting said sbox_out variable equal to the result of an f_bc_sbox function utilizing said sbox_in variable;

setting said perm_out variable equal to the result of an f_bc_perm function utilizing said sbox_out variable;

setting said first value of said next_state variable equal to the result of said eighth value of said current_state variable XOR said sbox_out variable;

setting said second value of said next_state variable equal to said first value of said current_state variable;

setting said third value of said next_state variable equal to the result of said second value of said current_state variable XOR the result of said eighth value of said current_state variable XO said sbox_out variable;

setting said fourth value of said next_state variable equal to the result of said third value of said current_state variable XOR the result of said eighth value of said current_state variable XO said sbox_out variable;

setting said fifth value of said_next state variable equal to the result of said fourth value of said current_state variable XOR the result of said eighth value of said current_state variable XO said sbox_out variable;

setting said sixth value of said next_state variable equal to said fifth value of said current_state variable;

setting said seventh value of said next_state variable equal to the result of said sixth value of said current_state variable XOR said perm_out variable; and setting said eighth value of said next_state variable equal to said seventh value of said current_state variable.

13. The method of claim 10, wherein said A logic and said B logic are constructed and arranged to carry out the following logical process:

providing an input_byte variable, providing a current_state variable, providing a common_key variable, providing a mode indicator, providing a step_counter variable, providing an int_sb register, said int_sb register having a first part and a second part, providing a polarity indicator, providing a step1_in variable, providing a step1_out variable, providing a step2_out variable, providing at least one next_state register, providing a next_sb_nibble variable, said next_sb_nibble variable having four values in sequence;

if said mode indicator is set to RESET then
    calling a reset procedure to reset all of said next_state registers according to a DVC common scrambling specification utilizing said common_key variable and said next state register,
    setting said next_sb_nibble variable equal to 0000;
otherwise if said mode indicator is set to HOLD then
    setting said next_state register to said curren_state variable;
    if said step counter is equal to 0 then
        setting said next_sb_nibble variable with the values contained in said first part of said int_sb register,
    otherwise
        setting said next_sb_nibble variable with the values contained in said second part of said int_sb register;
otherwise
    setting said step1_in variable to said current_state variable;
if said polarity indicator is set to ODD then
        calling a p_one_step procedure utilizing said input_byte variable, said step1_in variable, said mode indicator, said step1_out variable, and said polarity indicator;
    otherwise if said polarity indicator is set to EVEN then
        calling said p_one_step procedure utilizing said input_byte variable, said step1_out variable, said mode indicator, said step2_out variable, and said polarity; and
        setting said next_state variable equal to said step2_out variable;
    if said mode indicator is set to GEN then
        setting said values of said next_sb_nibble variable as a function of said step1_out variable and said step2_out variable;
    otherwise
        setting all of said values of said next_sb_nibble variable equal to 0.

14. The apparatus of claim 10, wherein said A logic and said B logic are constructed and arranged to carry out the following logical process:
    providing an input_byte signal having a first part and a second part, a mode signal, a polarity variable, an extra variable, an s1 variable, an s2 variable, an s3 variable, an s4 variable, and s5 variable, an s6 variable, and an s7 variable;
    providing a step_input structure, said step_input structure having
        an A array, said A array containing ten sequential registers numbered one through ten;
        a B array, said B array containing ten sequential registers numbered one through ten;
        an X register, a Y register, a Z register, a D register, an E register, an F register, a P register, a Q register, and an R register, each of said registers capable of containing a value;
    providing a step_output structure, said step_output structure having
        an A array, said A array containing ten sequential registers numbered one through ten;
        a B array, said B array containing ten sequential registers numbered one through ten;
        an X register, a Y register, a Z register, a D register, an E register, an F register, a P register, a Q register, and an R register, each of said registers of said step_output structure capable of containing a value, each of said registers of said step_output structure corresponding to one of said registers of said step_input structure;
    performing a shift register advance on registers ten through two of said A array of said step_output structure by setting said value of each of said registers equal to said value in said A array register of said step_input structure that lies adjacent sequentially to said A array register of said step_input structure that corresponds to said A array register of said step_output structure;
    performing a shift register advance on elements ten through two of said B array of said step_output structure by setting said value of each of said registers equal to said value in said B array register of said step_input structure that lies adjacent sequentially to said B array register of said step_input structure that corresponds to said B array register of said step_output structure;
    if said polarity variable is set to ODD then
        setting said one register of said A array of said step_output structure equal to the result of an f_t1 function utilizing said first part of said input_byte, register said register 10 of said A array of said step_input structure, said D register of said step step_input structure, said X register of said step_input structure, and said mode signal;
    otherwise
        setting said one register of said A array of said step_output structure equal to the result of an f_t1 function utilizing said second part of said input_byte register, said register 10 of said A array of said step_input structure, said D register of said step step_input structure, said X register of stid step_input structure, and said mode signal;
    if said polarity variable is set to ODD then
        setting said one register of said B trray of said step_output structure equal to the result of an f_t2 function utilizing said second part of said input_byte, said seven register of said B array of said step_input structure, said Y register of said step_input structure, said P register of said step_input structure, and said mode signal;
    otherwise
        setting said one register of said B array of said step_output structure equal to the result of an f_t2 function utilizing said first part of said input byte, said seven register of said B array of said step input structure, said Y register of said step_input structure,
    said P register of said step_input structure, and said mode signal;
    setting said extra variable equal to the result of an f_t3_extra function utilizing said B array of said step_input structure;
    setting said D register of said step_output structure equal to the result of an f_t3 function utilizing said extra variable, said E register of said step_input structure, and said Z register of said step_input structure;
    calling a p_t4 procedure utilizing said E, Z, Q, and R registers of said step_input structure, and said R and F register of said step_output structure;
    setting said E register of said step_output structure equal to said F register of said step_input structure;
    calling a p_s_gen procedure utilizing said A array of said step_input structure, and said s1, s2, s3, s4, s5, s6, and s7 variables; and
    calling a p_s_box procedure utilizing said s1, s2, s3, s4, sS, s6, and s7 registers, and said X, Y, Z, P, and Q registers of said step_output structure.

* * * * *